US012595050B2

(12) United States Patent
Pfaller et al.

(10) Patent No.: US 12,595,050 B2
(45) Date of Patent: Apr. 7, 2026

(54) ROTORCRAFT WITH A TAIL BOOM HAVING A DUCT-TYPE PORTION

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE); Uwe Kiesewetter, Rain Am Lech (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 167 days.

(21) Appl. No.: 18/367,847

(22) Filed: Sep. 13, 2023

(65) Prior Publication Data

US 2024/0140602 A1 May 2, 2024

(30) Foreign Application Priority Data

Oct. 28, 2022 (EP) ..................................... 22204459

(51) Int. Cl.
B64C 27/82 (2006.01)

(52) U.S. Cl.
CPC ...... B64C 27/82 (2013.01); B64C 2027/8254 (2013.01)

(58) Field of Classification Search
CPC ........................ B64C 2027/8254; B64C 27/82
See application file for complete search history.

(56) References Cited

U.S. PATENT DOCUMENTS

| | | | | |
|---|---|---|---|---|
| 2,609,053 A | * | 9/1952 | Lee | B64C 27/82 |
| | | | | 416/123 |
| 3,116,036 A | | 12/1963 | Nichols | |
| 5,619,797 A | | 4/1997 | Barquet et al. | |

(Continued)

FOREIGN PATENT DOCUMENTS

| | | |
|---|---|---|
| CN | 108045571 A | 5/2018 |
| DE | 1118017 B | 11/1961 |

(Continued)

OTHER PUBLICATIONS

The Fenestron—Part 3—The silent fan-in-fin tail rotor, Sep. 24, 2018 (Sep. 24, 2018). XP93028677A.

(Continued)

*Primary Examiner* — Magdalena Topolski

(74) *Attorney, Agent, or Firm* — BROOKS KUSHMAN P.C.

(57) ABSTRACT

A rotorcraft with at least one main rotor and a fuselage, comprising: a tail boom connected to the fuselage, the tail boom extending in a longitudinal direction from the fuselage toward a duct-type portion; a shroud provided at the duct-type portion and forming a transverse duct comprising a circumferential direction and a longitudinal extension oriented at least essentially perpendicular to the circumferential direction and the longitudinal direction of the tail boom; and at least one ducted tail rotor rotatably arranged in the transverse duct; wherein the shroud comprises a first section connected to the tail boom and a second section spaced apart from the tail boom and diametrically opposed to the first section, the first section comprising an airfoil-like aerodynamic profile.

20 Claims, 7 Drawing Sheets

(56)                    References Cited

U.S. PATENT DOCUMENTS

| | | | |
|---|---|---|---|
| 5,855,709 | A | 1/1999 | Bocoviz et al. |
| 9,725,164 | B2 | 8/2017 | Kelaidis |
| 12,304,626 | B2 * | 5/2025 | Pfaller .................... B64C 27/82 |
| 2013/0327881 | A1 | 12/2013 | Schneider et al. |
| 2015/0158584 | A1 | 6/2015 | Mores et al. |
| 2016/0264240 | A1 | 9/2016 | Stucki |
| 2020/0277049 | A1 | 9/2020 | Kooiman et al. |

FOREIGN PATENT DOCUMENTS

| | | | |
|---|---|---|---|
| DE | 202010007520 U1 * | 9/2010 | ............. B64C 27/82 |
| EP | 0508025 A1 | 10/1992 | |
| EP | 0680874 A1 | 11/1995 | |
| EP | 0686554 A1 | 12/1995 | |
| EP | 2883791 A1 | 6/2015 | |
| EP | 3067272 A1 | 9/2016 | |
| EP | 3424818 A1 | 1/2019 | |

OTHER PUBLICATIONS

European Search Report for European Application No. EP 22204459. 6, Completed by the European Patent Office, Dated Mar. 3, 2022, 12 pages.

* cited by examiner

Fig. 5
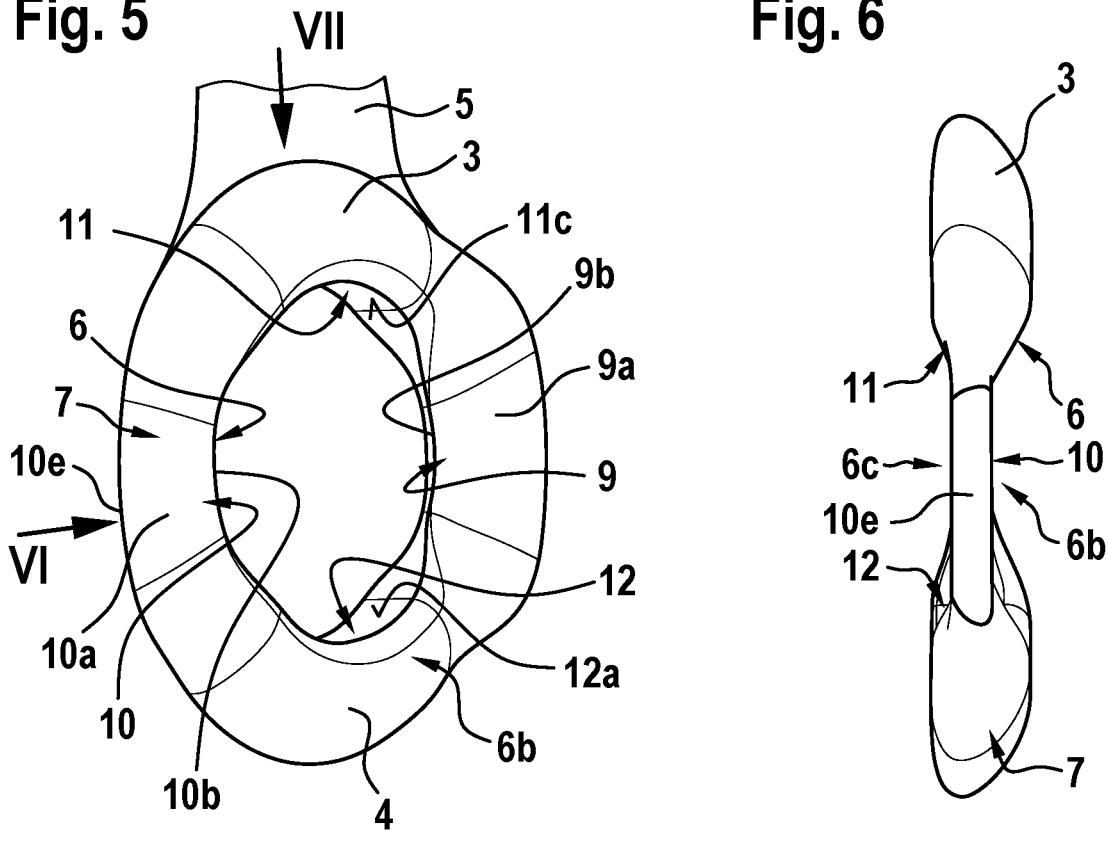
Fig. 6
Fig. 7
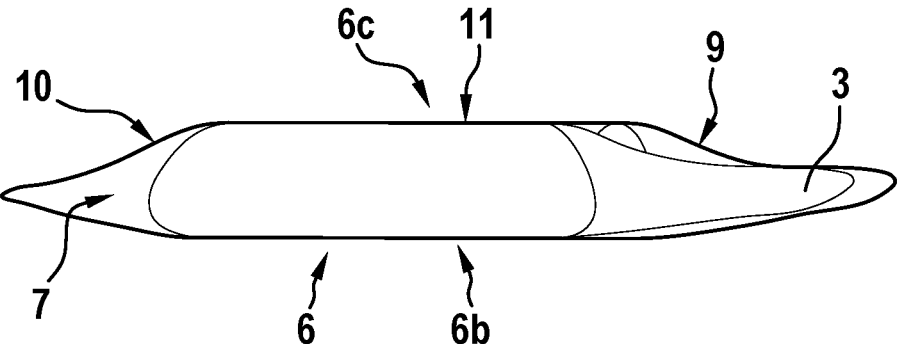

ROTORCRAFT WITH A TAIL BOOM HAVING A DUCT-TYPE PORTION

CROSS-REFERENCE TO RELATED APPLICATIONS

This application claims priority to European patent application No. EP 22204459.6 filed Oct. 28, 2022, the disclosure of which is incorporated in its entirety by reference herein.

TECHNICAL FIELD

The present disclosure is related to a rotorcraft with at least one main rotor and a fuselage, comprising a tail boom connected to the fuselage, the tail boom extending in a longitudinal direction from the fuselage toward a duct-type portion, a shroud provided at the duct-type portion and forming a transverse duct comprising a circumferential direction and a longitudinal extension oriented at least essentially perpendicular to the circumferential direction and the longitudinal direction of the tail boom, and at least one ducted tail rotor rotatably arranged in the transverse duct.

BACKGROUND

The document EP 3 067 272 A1 describes a rotorcraft with a main rotor and a counter-torque rotor that is positioned at a tail boom of the rotorcraft. The counter-torque rotor is provided for counteracting main rotor torque created by the main rotor on a respective airframe of the rotorcraft. More specifically, the counter-torque rotor is rotatably arranged within a transverse duct located at a duct-type portion of the tail boom and, thus, embodied as a ducted tail rotor in the form of a Fenestron® tail rotor. The duct-type portion is provided with a shroud that defines the transverse duct.

The documents EP 0 508 025 A1, EP 0 686 554 A1, and EP 0 680 874 A1 respectively describe a rotorcraft with a main rotor and a counter-torque rotor that is positioned at a tail boom of the rotorcraft. The counter-torque rotor is provided for counteracting main rotor torque created by the main rotor on a respective airframe of the rotorcraft. More specifically, the counter-torque rotor is rotatably arranged within a transverse duct located at a duct-type portion of the tail boom and, thus, embodied as a ducted tail rotor in the form of a Fenestron® tail rotor. The duct-type portion is provided with a shroud that defines the transverse duct such that the transverse duct has a constant depth over its circumference, and is further provided with a vertical fin.

In such a rotorcraft, the shroud is essentially optimized for generation of counter-torque thrust in hover flight condition. However, in forward flight condition, descend and climb the vertical fin essentially produces the required counter-torque thrust and causes significantly less drag than the shroud.

The documents EP 2 883 791 A1 and EP 3 424 818 A1 respectively describe another rotorcraft with a main rotor, a tail boom, and a ducted tail rotor in the form of a Fenestron® tail rotor. The ducted tail rotor is located at a duct-type portion of the tail boom, which is provided with a shroud and a vertical fin, and which further comprises a bumper for generation of counter-torque thrust. The shroud defines a transverse duct of the ducted tail rotor such that the transverse duct has a constant depth over its circumference. In order to reduce drag of the shroud in forward flight condition, descend and climb of the rotorcraft, the document EP 2 883 791 A1 suggests to improve aerodynamically a leading edge of a transition region between the shroud and the vertical fin and/or a trailing edge of the shroud, respectively at locations distant from the transverse duct.

In this rotorcraft, although a respective aerodynamic efficiency of the shroud is already improved, the shroud still produces a comparatively large amount of drag in forward flight condition of the rotorcraft. In fact, the transverse duct itself produces such comparatively large amount of drag due to suction and compression effects occurring in the forward flight condition on the transverse duct.

SUMMARY

It is an object of the present disclosure to provide a new rotorcraft with a tail boom connected to a fuselage, the new rotorcraft comprising a shroud with an improved aerodynamic efficiency, the shroud being provided at a duct-type portion of the tail boom.

This object is solved by a rotorcraft comprising the features of claim 1. More specifically, according to the disclosure a rotorcraft with at least one main rotor and a fuselage is provided, comprising a tail boom connected to the fuselage and a shroud. The tail boom extends in a longitudinal direction from the fuselage toward a duct-type portion, and the shroud is provided at the duct-type portion and forms a transverse duct comprising a circumferential direction and a longitudinal extension oriented at least essentially perpendicular to the circumferential direction and the longitudinal direction of the tail boom. At least one ducted tail rotor is rotatably arranged in the transverse duct. The shroud comprises a first section connected to the tail boom and a second section spaced apart from the tail boom and diametrically opposed to the first section, the first section comprising an airfoil-like aerodynamic profile.

Advantageously, the inventive rotorcraft is equipped with an efficiently designed shroud provided at a duct-type portion of the tail boom to reduce aerodynamic drag of the shroud in forward flight condition of the rotorcraft. More specifically, the shroud has an improved aerodynamic efficiency that is mainly due to an improved aerodynamic design in regions of the shroud which are located in axial prolongation of the tail boom between the tail boom and the transverse duct of the shroud as well as between the transverse duct and a trailing edge of the shroud. This improved aerodynamic design enables reduction of aerodynamic drag occurring in the forward flight condition of the rotorcraft at the transverse duct by means of a reduction of respective suction and compression effects occurring in the forward flight condition at the transverse duct.

Preferably, the improved aerodynamic design mainly consists in provision of aerodynamically improved vertical forward and vertical rearward middle sections of the transverse duct, which are respectively shaped like aerodynamic profiles. In addition, the trailing edge of the shroud at the position of the vertical rearward middle section may have a sharp edge similar to any aerodynamic profile. Moreover, the respective aerodynamic profiles in the vertical forward and vertical rearward middle sections may have a curved chord line for maximum sideward lift in forward flight condition of the rotorcraft, i.e. for maximum generation of counter-torque thrust in forward flight condition.

Advantageously, by shaping the vertical forward and vertical rearward middle sections of the shroud like aerodynamic profiles, the aerodynamic drag of the shroud in fast forward flight condition of the rotorcraft may be reduced significantly. However, in hover flight condition of the rotorcraft the counter-torque thrust generated by the duct-type portion with the ducted tail rotor and the shroud according to the present disclosure remains essentially similar to the counter-torque thrust that may be generated by means of a conventionally shaped shroud, whereas the generated counter-torque thrust may be increased in the fast forward flight condition of the rotorcraft.

According to a preferred embodiment, the airfoil-like aerodynamic profile comprises a trailing edge forming a portion of the transverse duct. The trailing edge comprises a plain area with a length oriented in parallel to the longitudinal extension of the transverse duct. The length corresponds at most to 1.2 times a projected rotor blade tip length summed up for a maximum pitch angle and a maximum flapping position of a tail rotor blade of the at least one ducted tail rotor.

According to a further preferred embodiment, the second section comprises another airfoil-like aerodynamic profile.

According to a further preferred embodiment, the other airfoil-like aerodynamic profile of the second section comprises a leading edge forming a portion of the transverse duct. The leading edge is rounded.

According to a further preferred embodiment, the other airfoil-like aerodynamic profile of the second section comprises a leading edge forming a portion of the transverse duct. The leading edge comprises a plain area with a length oriented in parallel to the longitudinal extension of the transverse duct. The length corresponds at most to 1.2 times a projected rotor blade tip length summed up for a maximum pitch angle and a maximum flapping position of a tail rotor blade of the at least one ducted tail rotor.

According to a further preferred embodiment, the other airfoil-like aerodynamic profile of the second section comprises a slim-shaped trailing edge.

According to a further preferred embodiment, the transverse duct comprises a depth oriented at least essentially in parallel to the longitudinal extension of the transverse duct. The depth varies along the circumferential direction of the transverse duct.

According to a further preferred embodiment, the shroud comprises a third section and a diametrically opposed fourth section. The third section and the fourth section are arranged on a common height axis oriented at least essentially perpendicular to the longitudinal direction of the tail boom. The depth of the transverse duct is greater in the third and fourth sections than in the first and second sections.

According to a further preferred embodiment, the third section comprises an aerodynamic profile oriented at least essentially perpendicular to the common height axis, and a maximum depth surface forming a portion of the transverse duct.

According to a further preferred embodiment, the fourth section comprises an aerodynamic profile oriented at least essentially perpendicular to the common height axis, and a maximum depth surface forming a portion of the transverse duct.

According to a further preferred embodiment, the first, second, third, and fourth sections are respectively interconnected via aerodynamically shaped transition regions.

According to a further preferred embodiment, the transverse duct is axially delimited by an air inlet region and an air outlet region. The air inlet region is rounded to enable increased suction in a hovering mode of the rotorcraft.

According to a further preferred embodiment, the air outlet region is provided in the circumferential direction of the transverse duct at least partly with a sharp corner.

According to a further preferred embodiment, the sharp corner is implemented by a simple cut edge, a Gurney flap or a covered Gurney flap.

According to a further preferred embodiment, the first section and the second section are inclined relative to a roll axis of the rotorcraft.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 5 shows another perspective view of the shroud of FIG. 1, FIG. 6 shows a rear view of the shroud of FIG. 5, FIG. 7 shows a top view of the shroud of FIG. 5.

DETAILED DESCRIPTION

Figure 1:
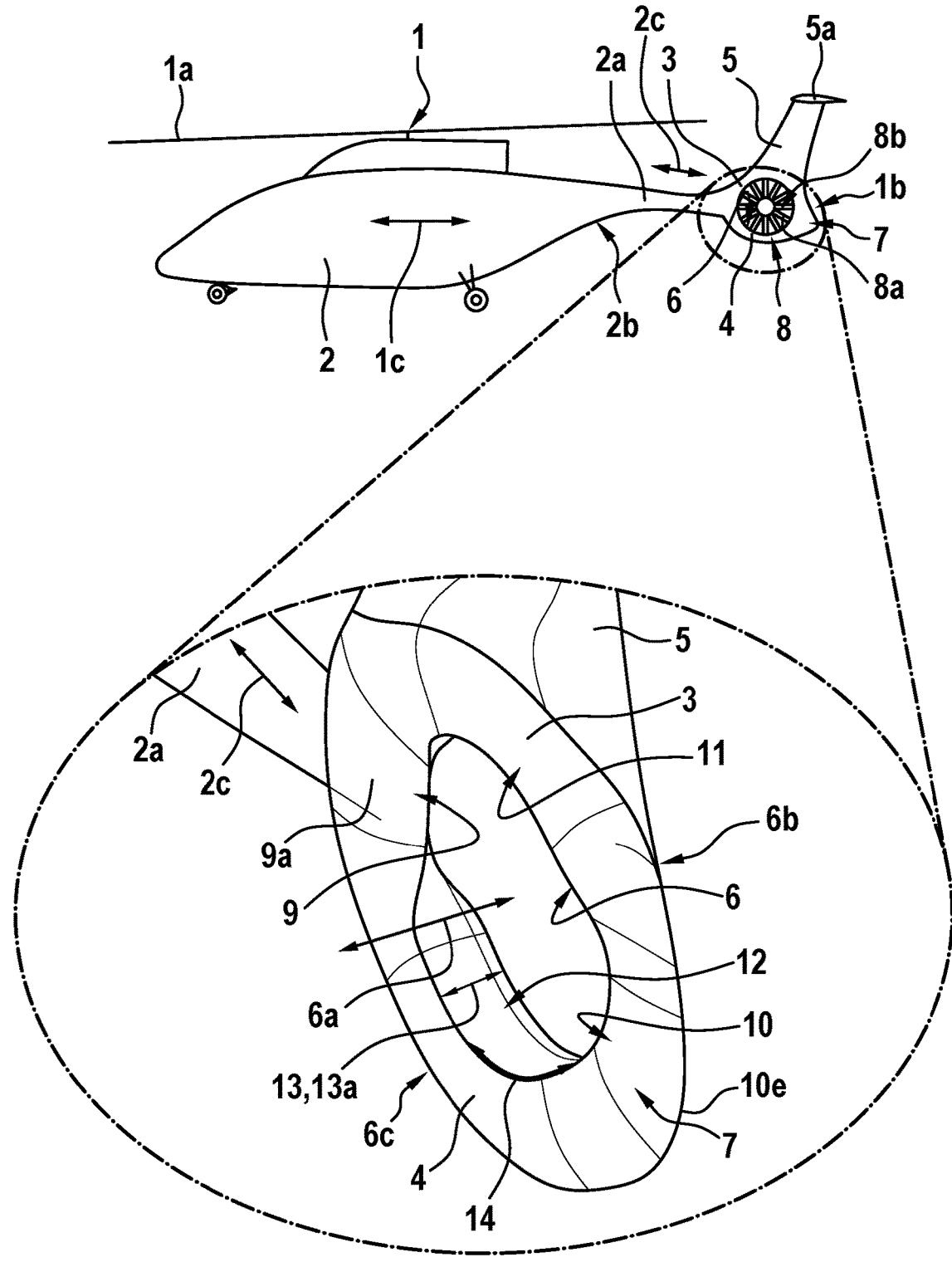
FIG. 1 shows a side view of a rotorcraft with a tail boom, a shroud, and a ducted tail rotor according to the disclosure, and an enlarged perspective view of the ducted tail rotor.

FIG. 1 shows a rotorcraft 1 with a fuselage 2 and a tail boom 2a that is connected to the fuselage 2 at a rear fuselage 2b. Illustratively, the rotorcraft 1 has an associated roll axis 1c and the tail boom 2a has a longitudinal extension in a longitudinal direction 2c that is preferably inclined relative to the roll axis 1c of the rotorcraft 1. The rotorcraft 1 is preferably embodied as a helicopter and, therefore, also referred to hereinafter as "the helicopter 1", for simplicity.

The helicopter 1 comprises at least one main rotor 1*a* configured to provide lift and/or forward thrust during operation, and at least one counter-torque device 8 configured to provide counter-torque during operation, i. e. to counter the torque created by rotation of the at least one main rotor 1*a* for purposes of balancing the helicopter 1 in terms of yaw. It should, however, be noted that the present disclosure is not limited to helicopters and may likewise be applied to other aircrafts that are equipped with rotary wings and at least one counter-torque device similar to the helicopter 1.

The at least one counter-torque device 8 is illustratively provided at an aft section 1*b* of the helicopter 1, which preferably comprises at least one duct-type portion 7 with a shroud 3. More specifically, the at least one duct-type portion 7 is provided at a rear end of the tail boom 2*a* which extends in the longitudinal direction 2*c* from the fuselage 2 toward the duct-type portion 7.

By way of example, the aft section 1*b* further comprises a bumper 4 and a fin 5 connected to the duct-type portion 7 and, more particularly, to the shroud 3. The fin 5 is illustratively in the form of a T-tail having a tail wing 5*a*. The tail wing 5*a* is preferably adjustable in its inclination and can overtake the functioning of a horizontal stabilizer. Alternatively, or in addition, the helicopter 1 may be provided with a suitable horizontal stabilizer.

However, it should be noted that the T-tail configuration of the fin 5 having the tail wing 5*a* is merely described for illustrating one exemplary realization of the helicopter 1 and not for limiting the present disclosure accordingly. Instead, the present disclosure as described hereinafter can be used with any helicopter and, more generally, any rotorcraft having a duct-type portion with a shroud, independent on whether this duct-type portion is connected to a T-tail fin or an otherwise configured fin, with or without a tail wing. Furthermore, the fin 5 may optionally be provided with a rudder that may be adapted to provide for enhanced directional control of the helicopter 1, e. g. by being deflected to large angles to reduce a given lateral drag of the fin 5 in sideward flight.

The shroud 3 of the duct-type portion 7 forms at least one transverse duct 6 having preferentially an at least approximately circular or annular cross section, in which at least one counter-torque rotor 8*a* with a plurality of rotor blades 8*b* is arranged rotatably. The at least one transverse duct 6 illustratively extends through the shroud 3.

More specifically, the transverse duct 6 illustratively comprises a circumferential direction 14 and a longitudinal extension 6*a* oriented at least essentially perpendicular to the circumferential direction 14 and the longitudinal direction 2*c* of the tail boom 2*a*. The circumferential direction 14 of the transverse duct 6 forms a circle that lies in the same plane than a rotor disc formed by rotation of the plurality of rotor blades 8*a* of the counter-torque rotor 8*a*.

The counter-torque rotor 8*a* which is rotatably arranged in the transverse duct 6 of the shroud 3 forms a so-called Fenestron® tail rotor. Accordingly, for simplicity and clarity, the counter-torque rotor 8*a* is hereinafter also referred to as the "ducted tail rotor 8*a*".

Illustratively, the shroud 3 comprises a first section 9 connected to the tail boom 2*a* and a second section 10 spaced apart from the tail boom 2*a*. The second section 10 is diametrically opposed to the first section 9 along the longitudinal direction 2*c* of the tail boom 2*a* and may comprise a slim-shaped trailing edge 10*e*.

More specifically, the second section 10 is located at a rearward part of the shroud 3 and, therefore, hereinafter also referred to as the "rear section 10", for simplicity and clarity. The first section 9 is located at a forward or front part of the shroud 3 forming a transition to the tail boom 2*a* and is, therefore, hereinafter also referred to as the "front section 9", for simplicity and clarity. At least the front section 9 comprises an airfoil-like aerodynamic profile 9*a*.

Illustratively, the shroud 3 further comprises an—in FIG. 1—upper section 11 and a—in FIG. 1—lower section 12. The upper section 11 is diametrically opposed to the lower section 12 along a common height axis (11*a* in FIG. 2).

The front section 9, the upper section 11, the rear section 10, and the lower section 12 encircle, i.e. peripherally delimit the transverse duct 6 in radial direction. In direction of the longitudinal extension 6*a*, the transverse duct 6 has a depth 13 and extends from a right-hand side 6*b* of the transverse duct 6, seen in forward flight direction of the helicopter 1, to a left-hand side 6*c*. The depth 13 is illustratively oriented at least essentially in parallel to the longitudinal extension 6*a* and preferably varies along the circumferential direction 14 of the transverse duct 6. Preferably, the depth 13 is greater in the upper and/or lower sections 11, 12 than in the front and/or rear sections 9, 10. Preferentially, the depth 13 is at its maximum in the upper section 11 and/or the lower section 12.

By way of example, it is assumed that the right-hand side 6*b* of the transverse duct 6 forms an air inlet region and, therefore, the right-hand side 6*b* is also referred to as the "air inlet region 6*b*" hereinafter, for simplicity and clarity. Accordingly, it is assumed that the left-hand side 6*c* of the transverse duct 6 forms an air outlet region and, therefore, the left-hand side 6*c* is also referred to as the "air outlet region 6*c*" hereinafter, for simplicity and clarity.

However, it should be noted that the location of the air inlet region 6*b* and the air outlet region 6*c* of the transverse duct 6 of the shroud 3 on the helicopter 1 depends on a rotation direction of the at least one main rotor 1*a* of the helicopter 1. In the present example, in which the air inlet region 6*b* is assumed to be located on the right-hand side of the helicopter 1, i.e. the transverse duct 6, and wherein the air outlet region 6*c* is assumed to be located on the left-hand side of the helicopter 1, i.e. the transverse duct 6, it is also assumed that the at least one main rotor 1*a* rotates in counter-clockwise direction. The shroud 3 and the transverse duct 6, as well as the ducted tail rotor 8*a*, are further described hereinafter with reference to FIG. 2 to FIG. 16.

Figure 2:
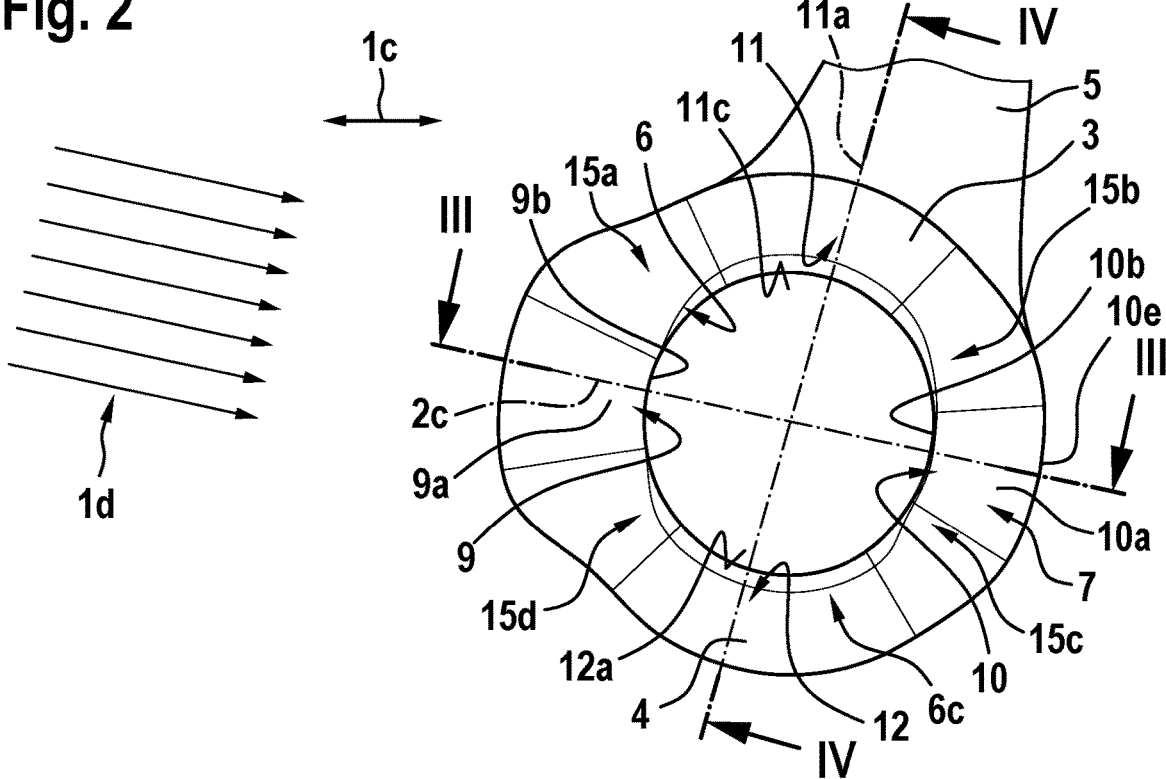
FIG. 2 shows a side view of the shroud of FIG. 1 in forward flight condition of the rotorcraft of FIG. 1.

FIG. 2 shows the duct-type portion 7 of FIG. 1 with the shroud 3 that forms the transverse duct 6. The duct-type portion 7 and, more particularly, the shroud 3 is connected to the bumper 4 and the fin 5. More specifically, FIG. 2 further illustrates the air outlet region 6*c* of FIG. 1 of the transverse duct 6. The air outlet region 6*c* is preferably provided in the circumferential direction 14 of FIG. 1 of the transverse duct 6 at least partly with a sharp corner (16 in FIG. 8). The sharp corner may e.g. be implemented by a simple cut edge, a Gurney flap or a covered Gurney flap.

However, it should be noted that the fin 5 is only shown partly and that the duct-type portion 7 is shown cut-off of the tail boom 2*a* of the helicopter 1 of FIG. 1, which has the longitudinal direction 2*c*, at an intersection between the duct-type portion 7 and the tail boom 2*a*, for simplicity of the drawing. Furthermore, the roll axis 1*c* of the helicopter 1 of FIG. 1 is only shown to illustrate a longitudinal direction of the helicopter 1 and is, therefore, also referred to as the "longitudinal direction 1*c*" hereinafter, for clarity. It can be seen that the longitudinal direction 1*c* is inclined relative to the longitudinal direction 2*c*. Moreover, an airflow 1*d* toward the duct-type portion 7 in forward flight condition of the helicopter 1 of FIG. 1 is illustrated in order to simplify localization of constituent components of the duct-type portion 7 below.

More specifically, as already described above at FIG. 1, the shroud 3 comprises the front section 9 with the airfoil-like aerodynamic profile 9a, the rear section 10, the upper section 11, and the lower section 12 which together encircle, i.e. peripherally delimit the transverse duct 6 in radial direction. The airfoil-like aerodynamic profile 9a illustratively comprises a trailing edge 9b forming a portion of the transverse duct 6.

Preferably, the front section 9, the upper section 11, the rear section 10, and the lower section 12 are respectively interconnected via aerodynamically shaped transition regions 15a, 15b, 15c, 15d. More specifically, the front section 9 and the upper section 11 are illustratively interconnected via the aerodynamically shaped transition region 15a, the upper section 11 and the rear section 10 are illustratively interconnected via the aerodynamically shaped transition region 15b, the rear section 10 and the lower section 12 are illustratively interconnected via the aerodynamically shaped transition region 15c, and the lower region 12 and the front region 9 are illustratively interconnected via the aerodynamically shaped transition region 15d. The aerodynamically shaped transition regions 15a, 15b, 15c, 15d form preferably smooth transitions, i.e. transitions with a predetermined radius, but without any sharp corners, edges, kinks, shoulders and/or steps.

Furthermore, the rear section 10 preferably comprises another airfoil-like aerodynamic profile, which is labelled with the reference sign 10a, and which preferentially differs from the airfoil-like aerodynamic profile 9a. Accordingly, the front section 9 and the rear section 10, which respectively form a suction area and a compression area, are tapered compared to conventional shroud designs, thus, significantly reducing drag of the shroud 3.

The other airfoil-like aerodynamic profile 10a of the rear section 10 illustratively comprises a leading edge 10b forming a portion of the transverse duct 6. The leading edge 10b may be rounded. The other airfoil-like aerodynamic profile 10a illustratively further comprises the trailing edge 10e of FIG. 1.

Moreover, the upper section 11 is diametrically opposed to the lower section 12 along a common height axis 11a that forms a height axis of the shroud 3 and is also referred to hereinafter as the "shroud height axis 11a", for clarity. The shroud height axis 11a is oriented at a predetermined angle with respect to the longitudinal direction 2c of the tail boom 2a of FIG. 1, illustratively at least essentially perpendicular. Preferably, the upper section 11 forms a maximum depth surface 11c of the transverse duct 6 and the lower section 12 similarly forms a maximum depth surface 12a of the transverse duct 6.

The front section 9 and the rear section 10 are arranged at a predetermined position with respect to the shroud height axis 11a, illustratively at least essentially in parallel. Likewise, the upper section 11 and the lower section 12 are arranged at a predetermined position with respect to the longitudinal direction 2c, illustratively at least essentially in parallel.

It should be noted that the described orientation of the shroud height axis 11a, i.e. the at least essentially perpendicular orientation with respect to the longitudinal direction 2c of the tail boom 2a of FIG. 1, as well as the described arrangement of the front section 9 and the rear section 10, i.e. the arrangement at least essentially in parallel to the shroud height axis 11a, are merely described to illustrate one possible orientation and arrangement. However, this orientation and arrangement are subject to optimization as preferably orientation of the shroud height axis 11a and arrangement of the front section 9 and the rear section 10 are dependent on the airflow 1d toward the duct-type portion 7 as illustrated in FIG. 2. A suitable optimization may consist in increasing respective angle ranges covered by the front section 9 and the rear section 10. For instance, illustratively the front section 9 and the rear section 10 respectively extend over an angle of approximately 20°, which may, however, be increased as required, for instance up to 90° or more.

Figure 3:
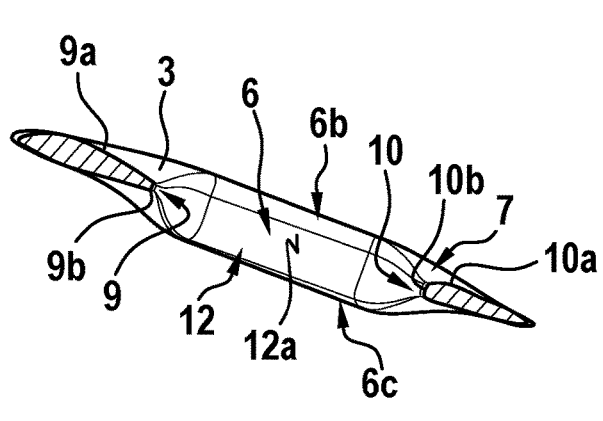
FIG. 3 shows a cut view of the shroud of FIG. 2 seen along a cut line III-III of FIG. 2.

FIG. 3 shows the duct-type portion 7 of FIG. 2 with the shroud 3 and shows, more particularly, a lower portion of the transverse duct 6 seen along a cut line III-III of FIG. 2, to further illustrate the airfoil-like aerodynamic profile 9a with the trailing edge 9b of the front section 9, as well as the other airfoil-like aerodynamic profile 10a with the leading edge 10b of the rear section 10, as well as the maximum depth surface 12a of the lower section 12. As can be seen in FIG. 3, the lower portion of the transverse duct 6 is delimited by the trailing edge 9b of the front section 9, the maximum depth surface 12a of the lower section 12, and the leading edge 10b of the rear section 10.

Figure 4:
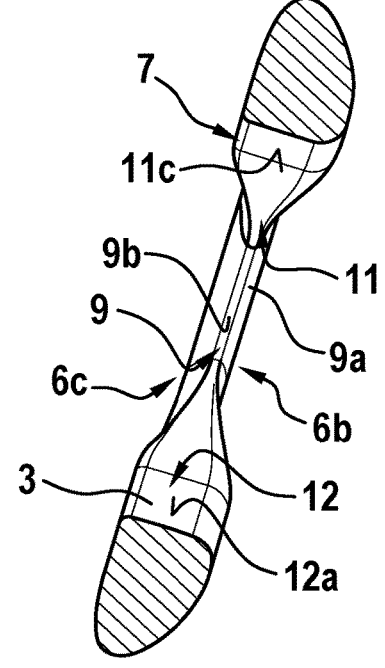
FIG. 4 shows a cut view of the shroud of FIG. 2 seen along a cut line IV-IV of FIG. 2.

FIG. 4 shows the duct-type portion 7 of FIG. 2 with the shroud 3 and shows, more particularly, a front portion of the transverse duct 6 seen along a cut line IV-IV of FIG. 2, to further illustrate the airfoil-like aerodynamic profile 9a with the trailing edge 9b of the front section 9, as well as the maximum depth surface 11c of the upper section 11, and the maximum depth surface 12a of the lower section 12. As can be seen in FIG. 4, the front portion of the transverse duct 6 is delimited by the maximum depth surface 12a of the lower section 12, the trailing edge 9b of the front section 9, and the maximum depth surface 11c of the upper section 11.

FIG. 5 shows the duct-type portion 7 of FIG. 1 with the shroud 3 that forms the transverse duct 6. The duct-type portion 7 and, more particularly, the shroud 3 is connected to the bumper 4 and the fin 5. More specifically, FIG. 5 further illustrates the air inlet region 6b of FIG. 1 of the transverse duct 6. The air inlet region 6b is preferably rounded to enable increased suction in a hovering mode of the helicopter 1 of FIG. 1. However, it should be noted that similar to FIG. 2 the fin 5 is only shown partly and the duct-type portion 7 is shown cut-off of the tail boom 2a of the helicopter 1 of FIG. 1.

More specifically, as already described above at FIG. 2, the shroud 3 comprises the front section 9 with the airfoil-like aerodynamic profile 9a, the rear section 10 with the other airfoil-like aerodynamic profile 10a and the trailing edge 10e, the upper section 11 with the maximum depth surface 11c, and the lower section 12 with the maximum depth surface 12a, which together encircle, i.e. peripherally delimit the transverse duct 6 in radial direction. The airfoil-like aerodynamic profile 9a comprises the trailing edge 9b and the other airfoil-like aerodynamic profile 10a comprises the leading edge 10b and the trailing edge 10e.

FIG. 6 shows the duct-type portion 7 of FIG. 5 with the shroud 3 and shows, more particularly, a rear end of the duct-type portion 7 seen in direction of an arrow VI of FIG. 5, to further illustrate the trailing edge 10e of the rear section 10, which is preferably slim-shaped and connected to the upper section 11 and the lower section 12 to form the transverse duct 6.

FIG. 7 shows the duct-type portion 7 of FIG. 5 with the shroud 3 and shows, more particularly, a top end of the duct-type portion 7 seen in direction of an arrow VII of FIG.

5, to further illustrate the upper section 11, which is connected to the rear section 10 and the front section 9 to form the transverse duct 6.

Figure 8:
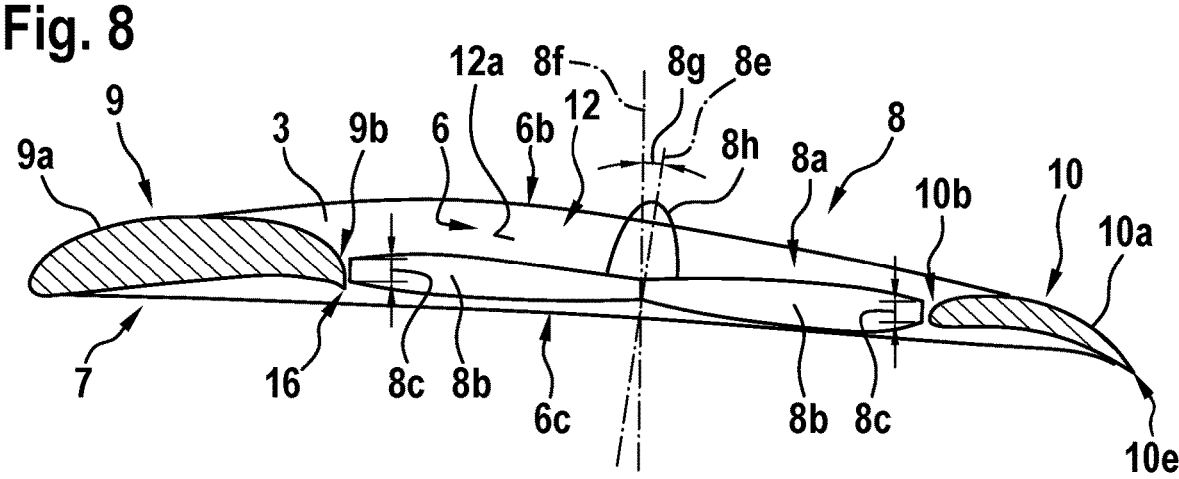
FIG. 8 shows a cut view of the shroud with the ducted tail rotor of FIG. 1, cut along a longitudinal direction of the tail boom of FIG. 1.

FIG. 8 shows the duct-type portion 7 of FIG. 1 to FIG. 7 with the ducted tail rotor 8a having the rotor blades 8b, and the shroud 3 that forms the transverse duct 6 with the air inlet region 6b and the air outlet region 6c. Illustratively, the duct-type portion 7 and the ducted tail rotor 8a are cut along the longitudinal extension (2c in FIG. 1) of the tail boom (2a of FIG. 1). Accordingly, the shroud 3 is shown with the front section 9 having the airfoil-like aerodynamic profile 9a and the trailing edge 9b, the lower section 12 having the maximum depth surface 12a, and the rear section 10 having the other airfoil-like aerodynamic profile 10a with the leading edge 10b and the trailing edge 10e. The trailing edge 9b of the airfoil-like aerodynamic profile 9 may be formed as a sharp corner 16.

Preferably, the ducted tail rotor 8a is equipped with at least two and, illustratively, with exactly two rotor blades 8b. In other words, the number of rotor blades is scalable in an application-specific manner, so that more than the two rotor blades 8b may be provided. Illustratively, only a comparatively small gap between the rotor blades 8b, i.e. respective rotor blade tips, and the transverse duct 6 is present to avoid pressure compensation between lower and upper profile area at the rotor blade tip for better aerodynamic performance of the rotor blades 8b.

Preferentially, the ducted tail rotor 8a has a rotation axis 8e that is preferably inclined by a respective inclination angle 8g relative to a transversal axis 8f defined by the shroud 3. The respective inclination angle 8g may e.g. be comprised in a range from −30° to 20°.

Illustratively, each one of the rotor blades 8b is shown with a blade tip height or length 8c. This blade tip length 8c preferably represents a projected rotor blade tip length summed up for a maximum pitch angle of the rotor blades 8b.

By way of example, the ducted tail rotor 8a comprises a gearbox fairing 8h that is preferably also at least essentially arranged inside of the shroud 3. However, it should be noted that the gearbox fairing 8h is only shown by way of example and not for limiting the disclosure accordingly. Instead, the ducted tail rotor 8a may e.g. directly be equipped with an electrical motor arranged in the shroud 3.

Figure 9:
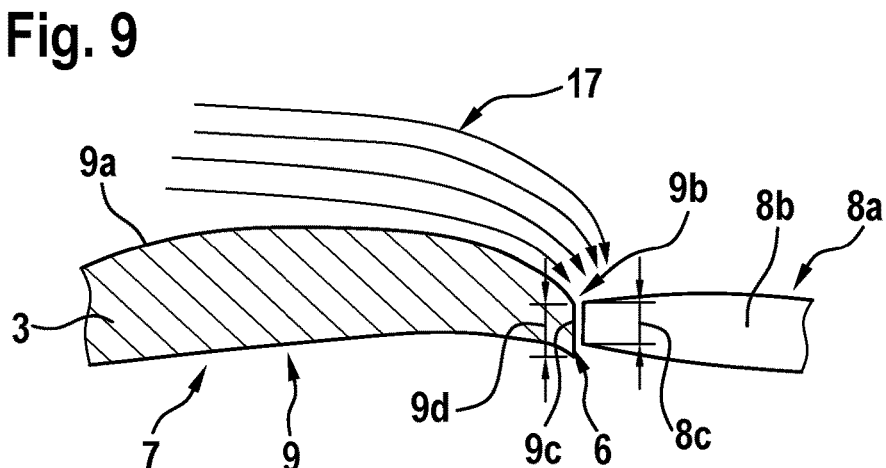
FIG. 9 shows a cut view of a front section of the shroud of FIG. 8 with a rotor blade of the ducted tail rotor of FIG. 8.
Figure 10:
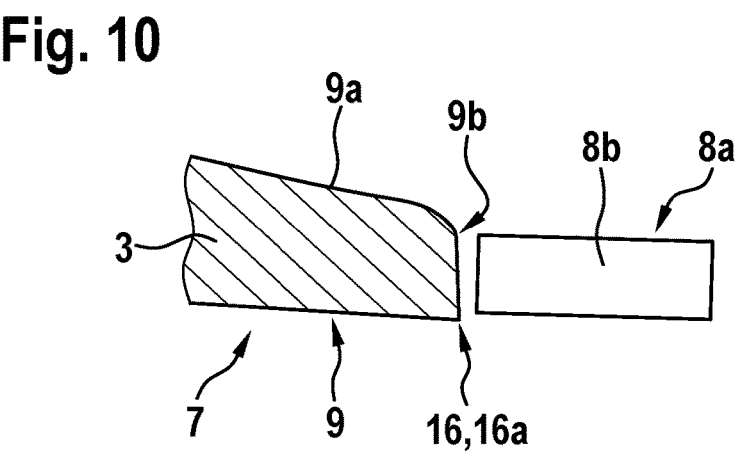
FIG. 10 shows a cut view of a front section of the shroud of FIG. 8 with a rotor blade of the ducted tail rotor of FIG. 8 according to a first variant.
Figure 11:
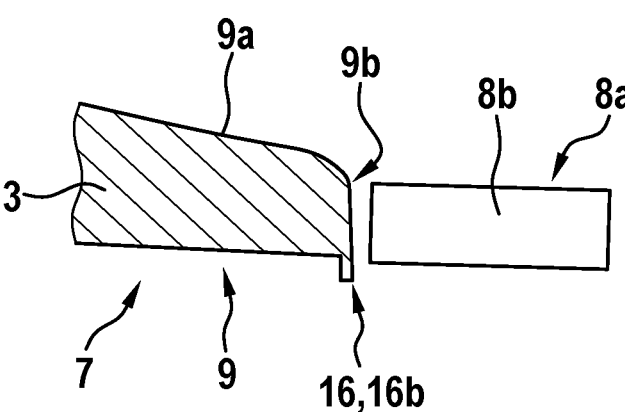
FIG. 11 shows a cut view of a front section of the shroud of FIG. 8 with a rotor blade of the ducted tail rotor of FIG. 8 according to a second variant.
Figure 12:
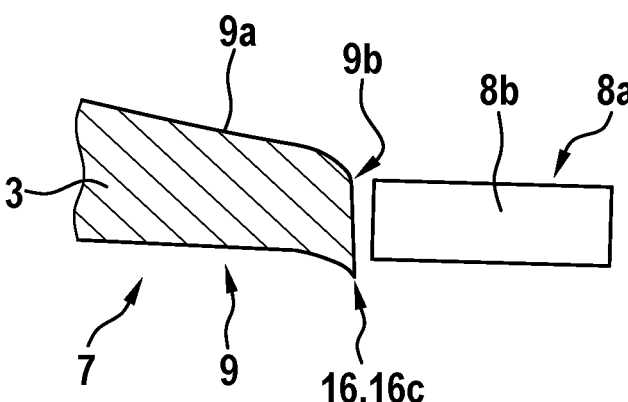
FIG. 12 shows a cut view of a front section of the shroud of FIG. 8 with a rotor blade of the ducted tail rotor of FIG. 8 according to a third variant.

FIG. 9 shows only a portion of one of the rotor blades 8b of the ducted tail rotor 8a with a trailing edge portion of the airfoil-like aerodynamic profile 9a of the front section 9 having the trailing edge 9b that forms a portion of the transverse duct 6 of the shroud 3 of FIG. 8. The rotor blade 8b is shown with the blade tip length 8c of FIG. 8, which preferably represents the projected rotor blade tip length summed up for the maximum pitch angle of the rotor blade 8b.

More specifically, an inflow air stream 17 that flows in the forward flight condition of the rotorcraft 1 of FIG. 1 along the airfoil-like aerodynamic profile 9a towards the ducted tail rotor 8a is illustrated. This inflow air stream 17 is redirected towards the ducted tail rotor 8a by means of a rounded edge provided at a trailing edge plain area 9c of the trailing edge 9b of the front section 9. More specifically, the trailing edge plain area 9c is arranged with respect to the inflow air stream 17 at a location upstream of the ducted tail rotor 8a, i.e. at the air inlet region 6b of FIG. 8.

Illustratively, the trailing edge plain area 9c has a length 9d oriented in parallel to the longitudinal extension (6a in FIG. 1) of the transverse duct 6. The length 9d preferably corresponds at most to 1.2 times the projected rotor blade tip length summed up for the maximum pitch angle, which is represented by the blade tip length 8c of the rotor blade 8b, and a maximum flapping position (8d in FIG. 13) of the rotor blade 8b of the ducted tail rotor 8a.

FIG. 10 shows again only a portion of the rotor blade 8b of the ducted tail rotor 8a with a trailing edge portion of the airfoil-like aerodynamic profile 9a of the front section 9 of the shroud 3 of FIG. 8, which comprises the trailing edge 9b. The trailing edge 9b of the airfoil-like aerodynamic profile 9a is shown with the sharp corner 16 of FIG. 8. However, in contrast to FIG. 8 the sharp corner 16 is now implemented by a simple cut edge 16a.

FIG. 11 shows again only a portion of the rotor blade 8b of the ducted tail rotor 8a with a trailing edge portion of the airfoil-like aerodynamic profile 9a of the front section 9 of the shroud 3 of FIG. 8, which comprises the trailing edge 9b. The trailing edge 9b of the airfoil-like aerodynamic profile 9a is shown with the sharp corner 16 of FIG. 8. However, in contrast to FIG. 8 the sharp corner 16 is now implemented by a so-called Gurney flap 16b.

FIG. 12 shows again only a portion of the rotor blade 8b of the ducted tail rotor 8a with a trailing edge portion of the airfoil-like aerodynamic profile 9a of the front section 9 of the shroud 3 of FIG. 8, which comprises the trailing edge 9b. The trailing edge 9b of the airfoil-like aerodynamic profile 9a is shown with the sharp corner 16 of FIG. 8. However, in contrast to FIG. 8 the sharp corner 16 is now implemented by a covered Gurney flap 16c.

Figure 13:
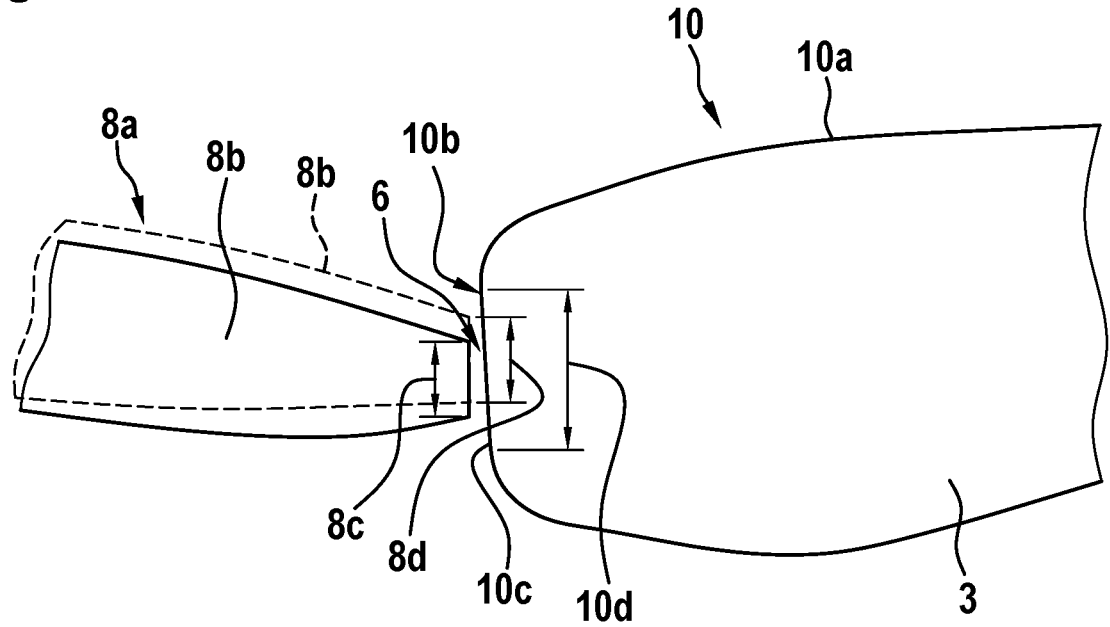
FIG. 13 shows a cut view of a rear section of the shroud of FIG. 8 with a rotor blade of the ducted tail rotor of FIG. 8.

FIG. 13 shows only a portion of one of the rotor blades 8b of the ducted tail rotor 8a with a leading edge portion of the airfoil-like aerodynamic profile 10a of the rear section 10 having the leading edge 10b that forms a portion of the transverse duct 6 of the shroud 3 of FIG. 8. The rotor blade 8b is shown with the blade tip length 8c of FIG. 8, which preferably represents the projected rotor blade tip length summed up for the maximum pitch angle of the rotor blade 8b.

More specifically, the leading edge 10b illustratively comprises a plain area 10c with a length 10d oriented in parallel to the longitudinal extension (6a of FIG. 1) of the transverse duct 6. The length 10d preferably corresponds at most to 1.2 times the projected rotor blade tip length summed up for the maximum pitch angle, which is represented by the blade tip length 8c of the rotor blade 8b, and a maximum flapping position 8d of the rotor blade 8b of the ducted tail rotor 8a.

Figure 14:
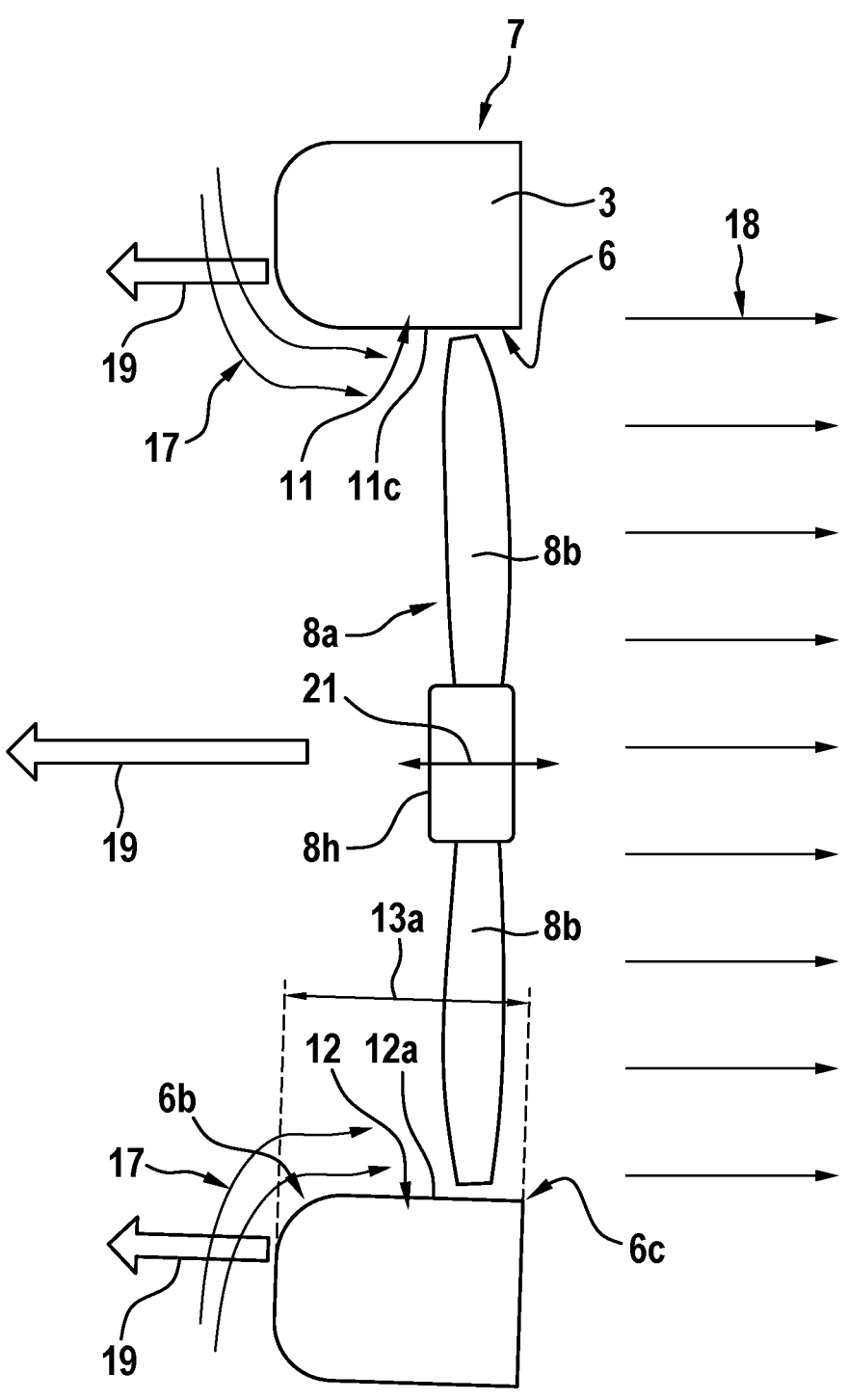
FIG. 14 shows a cut view of the shroud with the ducted tail rotor of FIG. 1 cut along a height direction of the shroud perpendicular to the longitudinal direction of the tail boom of FIG. 1.

FIG. 14 shows the duct-type portion 7 of FIG. 1 to FIG. 7 with the ducted tail rotor 8a having the rotor blades 8b and the gearbox fairing 8h of FIG. 8, as well as the shroud 3 that forms the transverse duct 6 with the air inlet region 6b and the air outlet region 6c. As described above at FIG. 5, the air inlet region 6b is preferably rounded to enable increased suction in a hovering mode of the helicopter 1 of FIG. 1.

Illustratively, the duct-type portion 7 and the ducted tail rotor 8a are cut along the shroud height axis (11a in FIG. 2) of the shroud 3. Accordingly, the shroud 3 is shown with the upper section 11 having the maximum depth surface 11c, and the lower section 12 having the maximum depth surface 12a. Illustratively, the maximum depth surface 12a is shown at a position of the maximum depth 13a of the transverse duct 6. However, for simplicity and clarity of the drawing, illustration of the front section 9 of the shroud 3 is omitted.

In operation, an inflow air stream, which is labelled with the reference sign 17 according to FIG. 9, flows into the transverse duct 6 via the air inlet region 6b. The ducted tail rotor 8a rotates such that the rotor blades 8b generate an outflow air stream 18 from the inflow air stream 17. Thereby, counter-torque thrust 19 is generated for stabilizing the helicopter 1 of FIG. 1 in terms of yaw.

At this point, it should be noted that the representation of FIG. 14 is merely intended to show an illustrative configuration which, however, should not be considered as being exclusive. For instance, although the ducted tail rotor 8a is illustratively arranged close to the air outlet region 6c, it may be arranged closer to the air inlet region 6b or even farther away from the air inlet region 6b, as illustrated with an arrow 21. Moreover, although it is mentioned that the air inlet region 6b is rounded whereas the air outlet region 6c has a sharp corner according to FIG. 9 to FIG. 12, the air outlet region 6c may likewise be rounded. Furthermore, a respective radius selected for the rounding of the air inlet region 6b may be adapted in wide ranges to improve suction in the hovering mode of the helicopter 1 of FIG. 1, and so on.

Figure 15:
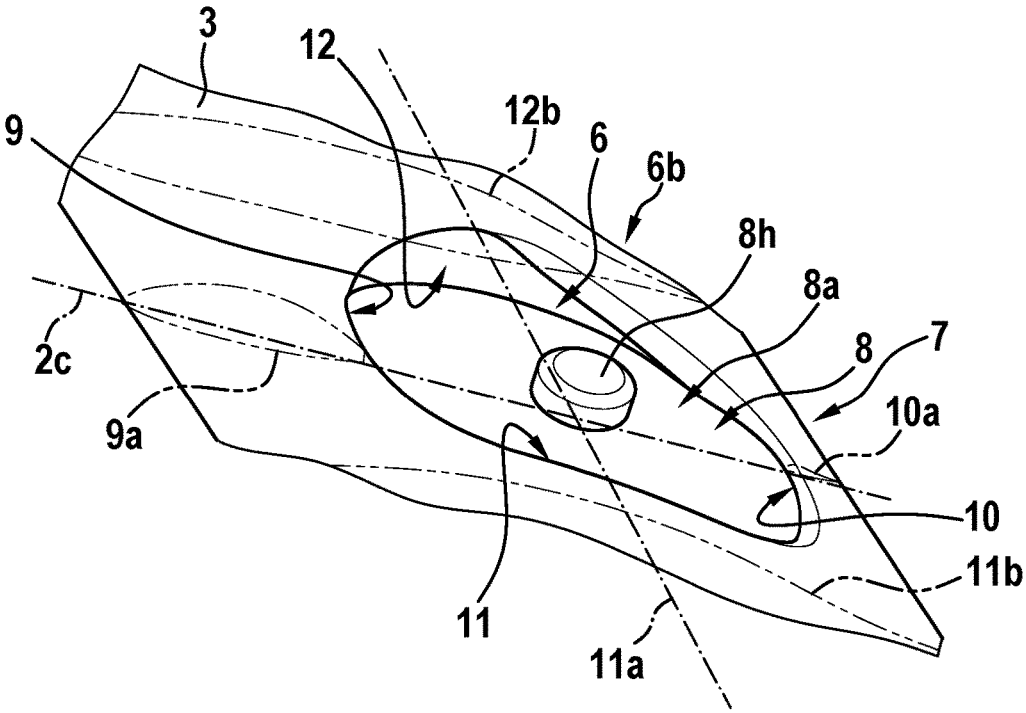
FIG. 15 shows a perspective view of the shroud with the ducted tail rotor of FIG. 1.

FIG. 15 shows the duct-type portion 7 of FIG. 14 with the ducted tail rotor 8a having the gearbox fairing 8h, as well as the shroud 3 with the shroud height axis 11a, which forms the transverse duct 6 with the air inlet region 6b. The air inlet region 6b is preferably rounded to enable increased suction in the hovering mode of the helicopter 1 of FIG. 1. According to FIG. 1 to FIG. 8, the shroud 3 comprises the front section 9 with the airfoil-like aerodynamic profile 9a, the rear section 10 with the other airfoil-like aerodynamic profile 10a, the upper section 11, and the lower section 12, which together encircle, i.e. peripherally delimit the transverse duct 6 in radial direction.

Illustratively, the upper section 11 comprises an aerodynamic profile 11b oriented at least essentially perpendicular to the shroud height axis 11a. Similarly, the lower section 12 comprises an aerodynamic profile 12b oriented at least essentially perpendicular to the shroud height axis 11a.

Figure 16:
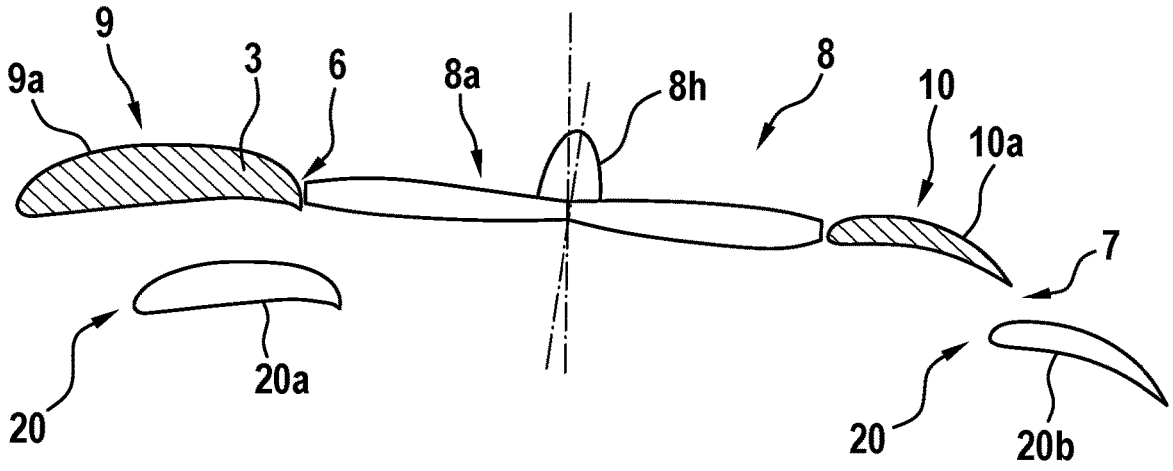
FIG. 16 shows a cut view of the shroud with the ducted tail rotor of FIG. 1 according to a variant, cut along a longitudinal direction of the tail boom of FIG. 1.

FIG. 16 shows the duct-type portion 7 of FIG. 14 and FIG. 15 with the ducted tail rotor 8a having the gearbox fairing 8h, as well as the shroud 3 which forms the transverse duct 6. For simplicity and clarity of the drawing, the shroud 3 is only shown with the front section 9 having the airfoil-like aerodynamic profile 9a, and the rear section 10 having the other airfoil-like aerodynamic profile 10a.

However, in contrast to FIG. 14 and FIG. 15 the duct-type portion 7 is now provided with an additional shrouding 20. More specifically, by way of example the front section 9 now comprises one or more additional airfoil-like aerodynamic profiles 20a. Similarly, the rear section 10 now comprises one or more additional airfoil-like aerodynamic profiles 20b.

It should be noted that the above described, preferred embodiments are merely described to illustrate possible embodiments of the present disclosure, but not in order to restrict the present disclosure thereto. Instead, multiple modifications and variations of the disclosure are possible and should, therefore, also be considered as being part of the disclosure.

For instance, although all airfoil-like aerodynamic profiles are shown with an illustrative curvature, this curvature may be more or less pronounced dependent on required counter-torque thrust generation. Furthermore, a respective extension of each one of the above described front, upper, rear, and lower sections of the shroud may be adapted as required, and so on.

Moreover, a respective curvature of the rounded air inlet region may be adapted as required. In fact, about 50% of the overall generated counter-torque thrust is generated by the ducted tail rotor, whereas the remaining 50% is generated by a suction effect of the rounded air inlet region. Thus, improving the suction effect by accurately selecting a suitable curvature of the rounded air inlet region improves generation of counter-torque thrust.

REFERENCE LIST 1 rotorcraft
1a main rotor
1b rotorcraft aft section
1c rotorcraft roll axis
1d airflow in forward flight direction
2 fuselage
2a tail boom
2b rear fuselage
2c tail boom longitudinal direction
3 shroud
4 bumper
5 fin
5a tail wing
6 transverse duct
6a duct longitudinal extension
6b duct right-hand side, air inlet region
6c duct left-hand side, air outlet region
7 duct-type tail portion
8 counter-torque device
8a counter-torque rotor
8b counter-torque rotor blades
8c projected rotor blade tip length at extreme pitch angle
8d projected rotor blade tip length in extreme flapping position
8e inclined rotation axis
8f uninclined rotation axis
8g inclination angle
8h gearbox fairing
9 shroud front section
9a airfoil-like aerodynamic profile
9b trailing edge of airfoil-like aerodynamic profile
9c trailing edge plain area
9d plain area length
10 shroud rear section
10a airfoil-like aerodynamic profile
10b leading edge of airfoil-like aerodynamic profile
10c leading edge plain area
10d plain area length
10e slim-shaped trailing edge
11 shroud upper section
11a shroud height axis
11b upper section airfoil-like aerodynamic profile
11c maximum depth surface
12 shroud lower section
12a maximum depth surface
12b lower section airfoil-like aerodynamic profile
13 transverse duct depth
13a maximum depth
14 transverse duct circumferential direction
15a, 15b, 15c, 15d smooth transition regions
16 sharp corner
16a simple cut edge
16b Gurney flap
16c covered Gurney flap
17 inflow air stream
18 outflow air stream
19 generated counter-torque thrust
20 additional shrouding
20a, 20b additional airfoil-like aerodynamic profiles
21 gearbox fairing movement directions

What is claimed is:

1. A rotorcraft with at least one main rotor and a fuselage, comprising:

a tail boom connected to the fuselage, the tail boom extending in a longitudinal direction from the fuselage toward a duct-type portion;

a shroud provided at the duct-type portion and forming a transverse duct comprising a circumferential direction and a longitudinal extension oriented at least essentially perpendicular to the circumferential direction and the longitudinal direction of the tail boom; and at least one ducted tail rotor rotatably arranged in the transverse duct;

wherein the shroud comprises a first section connected to the tail boom and a second section spaced apart from the tail boom and diametrically opposed to the first section, the first section comprising an airfoil aerodynamic profile;

wherein the transverse duct comprises a depth oriented at least essentially in parallel to the longitudinal extension of the transverse duct, and wherein the depth varies along the circumferential direction of the transverse duct.

2. The rotorcraft of claim 1, wherein the airfoil aerodynamic profile comprises a trailing edge forming a portion of the transverse duct, the trailing edge comprising a plain area with a length oriented in parallel to the longitudinal extension of the transverse duct, the length corresponding at most to 1.2 times a projected rotor blade tip length summed up for a maximum pitch angle and a maximum flapping position of a tail rotor blade of the at least one ducted tail rotor.

3. The rotorcraft of claim 2, wherein the projected rotor blade tip length is defined as the maximum linear displacement of a rotor blade tip measured in the direction of the longitudinal extension of the transverse duct, resulting from a combined condition of a maximum pitch angle and a maximum flapping position of the rotor blade.

4. The rotorcraft of claim 1, wherein the second section comprises another airfoil aerodynamic profile.

5. The rotorcraft of claim 4, wherein the other airfoil aerodynamic profile of the second section comprises a leading edge forming a portion of the transverse duct, the leading edge being rounded.

6. The rotorcraft of claim 4, wherein the other airfoil aerodynamic profile of the second section comprises a leading edge forming a portion of the transverse duct, the leading edge comprising a plain area with a length oriented in parallel to the longitudinal extension of the transverse duct, the length corresponding at most to 1.2 times a projected rotor blade tip length summed up for a maximum pitch angle and a maximum flapping position of a tail rotor blade of the at least one ducted tail rotor.

7. The rotorcraft of claim 4, wherein the other airfoil aerodynamic profile of the second section comprises a slim-shaped trailing edge.

8. The rotorcraft of claim 1, wherein the shroud comprises a third section and a diametrically opposed fourth section, the third section and the fourth section being arranged on a common height axis oriented at least essentially perpendicular to the longitudinal direction of the tail boom, and wherein the depth of the transverse duct is greater in the third and fourth sections than in the first and second sections.

9. The rotorcraft of claim 8, wherein the third section comprises an aerodynamic profile oriented at least essentially perpendicular to the common height axis, and a maximum depth surface forming a portion of the transverse duct.

10. The rotorcraft of claim 8, wherein the fourth section comprises an aerodynamic profile oriented at least essentially perpendicular to the common height axis, and a maximum depth surface forming a portion of the transverse duct.

11. The rotorcraft of claim 8, wherein the first, second, third, and fourth sections are respectively interconnected via aerodynamically shaped transition regions.

12. The rotorcraft of claim 1, wherein the transverse duct is axially delimited by an air inlet region and an air outlet region, and wherein the air inlet region is rounded to enable increased suction in a hovering mode of the rotorcraft.

13. The rotorcraft of claim 12, wherein the air outlet region is provided in the circumferential direction of the transverse duct at least partly with a sharp corner.

14. The rotorcraft of claim 13, wherein the sharp corner is implemented by a simple cut edge, a Gurney flap or a covered Gurney flap.

15. The rotorcraft of claim 1, wherein the first section and the second section of the shroud are inclined relative to a roll axis of the rotorcraft.

16. A rotorcraft comprising:

a main rotor;

a fuselage;

a tail boom connected to the fuselage and extending longitudinally from the fuselage toward a duct-type portion;

a shroud at the duct-type portion and defining a transverse duct comprising a circumferential direction and a longitudinal extension oriented at least essentially perpendicular to the circumferential direction and the longitudinal direction of the tail boom; and a ducted tail rotor rotatably arranged in the transverse duct;

wherein the shroud comprises a first section connected to the tail boom and a second section spaced apart from the tail boom and opposed to the first section, the first section comprising an airfoil aerodynamic profile, and wherein the transverse duct comprises a depth oriented at least essentially in parallel to the longitudinal extension of the transverse duct, and wherein the depth varies along the circumferential direction of the transverse duct.

17. The rotorcraft of claim 16, wherein the airfoil aerodynamic profile comprises a trailing edge forming a portion of the transverse duct, the trailing edge comprising a plain area with a length oriented in parallel to the longitudinal extension of the transverse duct, the length corresponding at most to 1.2 times a projected rotor blade tip length summed up for a maximum pitch angle and a maximum flapping position of a tail rotor blade of the at least one ducted tail rotor, and wherein the projected rotor blade tip length is defined as the maximum linear displacement of a rotor blade tip measured in the direction of the longitudinal extension of the transverse duct, resulting from a combined condition of a maximum pitch angle and a maximum flapping position of the rotor blade.

18. The rotorcraft of claim 16, wherein the shroud comprises a third section and an opposed fourth section, the third section and the fourth section on a common height axis oriented at least essentially perpendicular to the longitudinal direction of the tail boom, and wherein the depth of the transverse duct is greater in the third and fourth sections than in the first and second sections, the third section comprises an aerodynamic profile oriented at least essentially perpendicular to the common height axis, and a maximum depth surface defining a portion of the transverse duct, wherein the fourth section comprises an aerodynamic profile oriented at least essentially perpendicular to the common height axis, and a maximum depth surface defining a portion of the transverse duct, wherein the first, second, third, and fourth sections are respectively interconnected via shaped transition regions, and wherein the transverse duct is axially delimited by an air inlet region and an air outlet region, the air inlet region being rounded to enable increased suction in a hovering mode of the rotorcraft.

19. The rotorcraft of claim 16, wherein the second section comprises another airfoil aerodynamic profile.

20. A rotorcraft comprising:

a main rotor;

a fuselage;

a tail boom extending from the fuselage toward a duct;

a shroud at the duct defining a transverse duct having a circumferential direction and a longitudinal extension; and a ducted tail rotor rotatably arranged in the transverse duct;

the shroud comprising a first section connected to the tail boom and a second section spaced from the tail boom opposed to the first section, the first section having an aerodynamic profile;

wherein the transverse duct comprises a depth that varies along the circumferential direction of the transverse duct.

* * * * *